(12) United States Patent
Hamada

(10) Patent No.: US 8,279,252 B2
(45) Date of Patent: Oct. 2, 2012

(54) COMMUNICATION TERMINAL APPARATUS, COMMUNICATION METHOD, AND INFORMATION RECORDING MEDIUM

(75) Inventor: Mitsuru Hamada, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1475 days.

(21) Appl. No.: 11/879,862

(22) Filed: Jul. 18, 2007

(65) Prior Publication Data
US 2008/0018729 A1 Jan. 24, 2008

(30) Foreign Application Priority Data
Jul. 20, 2006 (JP) .................................. 2006-197585

(51) Int. Cl.
*H04N 7/14* (2006.01)
(52) U.S. Cl. ................ 348/14.01; 348/14.02; 348/14.03; 348/14.05
(58) Field of Classification Search ..... 348/14.01–14.16
See application file for complete search history.

(56) References Cited

FOREIGN PATENT DOCUMENTS

| JP | 2001-186279 | | 7/2001 |
|---|---|---|---|
| JP | 2001186279 A | * | 7/2001 |
| JP | 2001-309086 | | 11/2001 |
| JP | 2004-221738 | | 8/2004 |
| JP | 2004221738 A | * | 8/2004 |
| JP | 2004312634 A | * | 11/2004 |

OTHER PUBLICATIONS

Office Action dated May 13, 2008 (with English translation) issued for the Japanese Patent Application No. 2006-197585.

* cited by examiner

*Primary Examiner* — Melur Ramakrishnaiah
(74) *Attorney, Agent, or Firm* — Cozen O'Connor

(57) ABSTRACT

A storage unit stores name, phone number, and a videophoning flag indicating whether to preferentially use a videophone or not in association with each person to communicate with. A CPU refers to the videophoning flag associated with a person when controlling a communication unit to make a call to that person, and determines whether to prioritize a voice phone or to prioritize the videophone. The CPU controls the communication unit to make a call by the videophone if the videophone is prioritized, or to make a call by the voice phone if the voice phone is prioritized. When a call from a person is received by the videophone, the CPU refers to the videophoning flag of that person, and permits communication by the videophone if the videophone is prioritized or does not permit communication by the videophone if the voice phone is prioritized.

9 Claims, 11 Drawing Sheets

COMMUNICATION TERMINAL APPARATUS, COMMUNICATION METHOD, AND INFORMATION RECORDING MEDIUM

BACKGROUND OF THE INVENTION

1. Field of the Invention

The present invention relates to a communication terminal apparatus, a communication method, and an information recording medium for selecting either a voice phone or a videophone for having telephone communication.

2. Description of the Related Art

Videophone apparatuses that can enable telephone communication by sending and receiving voices and also video (face images, etc.) have become popular. For example, Unexamined Japanese Patent Application KOKAI Publication No. 2004-221738 discloses a communication terminal apparatus which enables the user to switch the communication method from videophoning to voice phoning and vice versa at an arbitrary time. According to this, the communication terminal apparatus can save the power to be consumed, by placing restraint on the use of the videophone that requires more power. Further, Unexamined Japanese Patent Application KOKAI Publication No. 2001-309086 discloses a communication terminal apparatus which allows the user to pre-register attributes of whether to answer a call by the videophone or not regarding each person registered in the address book, and when a call from a videophone is received, determines whether to answer the call by the videophone according to the attribute of the calling person. According to this, the communication terminal apparatus can automatically determine the communication method when a call is received.

Incidentally, if the telephone of the person to call is not a videophone-compatible model, one would fail in connecting to this person by making a call to this person by a videophone, and would have to make another call to this person by a voice phone after once hanging up the videophone. Thus, the user has to waste a call by the videophone. As obvious from this, according to the conventional art, the user has to remember by him/herself whether the telephone of the person to call is a videophone-compatible one or not, when making a phone call to this person. Further, the user has to select the communication method in consideration of whether the person to call is someone to whom the user allows him/herself to send his/her images, when making a phone call to this person. Furthermore, when wanting to reject a video call from someone, the user has to go through all the trouble of checking who is calling and determining whether to answer the call by the videophone or not before picking up the phone.

SUMMARY OF THE INVENTION

An object of the present invention is to make it possible to appropriately select whether to communicate by a videophone or to communicate by a voice phone, according to the person to communicate with, without causing much load on the user.

A communication terminal apparatus according to a first aspect of the present invention comprises:

a storage unit which pre-stores telephone control information indicating whether to preferentially use a videophone using both voices and images or to preferentially use a voice phone using only voices, in association with a person to communicate with;

a selection unit which, when a call is to be made to an arbitrary person, selects whether to preferentially use the voice phone or to preferentially use the videophone by referring to the telephone control information stored in association with that person; and a communication control unit which makes a call by the videophone in a case where the videophone is selected as a result of selection by the selection unit, or makes a call by the voice phone in a case where the voice phone is selected as a result of selection by the selection unit.

A communication terminal apparatus according to a second aspect of the present invention comprises:

a storage unit which stores a communication record indicating whether a communication has been performed by a videophone using both voices and images or by a voice phone using only voices, in association with a person to communicate with;

a determination unit which, when a call is to be made to an arbitrary person, determines whether to use the voice phone or to use the videophone by referring to the communication record stored in association with that person; and a communication control unit which makes a call to that person by either of the voice phone and the videophone that is determined by the determination unit.

According to the present invention, when making a call to an arbitrary person, the communication terminal apparatus does so by using the videophone in a case where preference to the videophone is set in association with that person, or by using the voice phone in a case where preference to the voice phone is set in association with that person. Therefore, when making a call, the user can have either the videophone or the voice phone appropriately selected for each person to communicate with, without minding whether to use the videophone or the voice phone. Further, the user can be prevented from making a call in vain.

Further, when a call from a person is received by the videophone, the communication terminal apparatus can select either of the videophone and the voice phone that is appropriate according to the communication history (call making record) regarding the person.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiments of the present invention will be explained below with reference to the drawings. In the following explanation, a general mobile phone apparatus will be used as a communication terminal apparatus.

(Embodiment 1)

Figure 1:
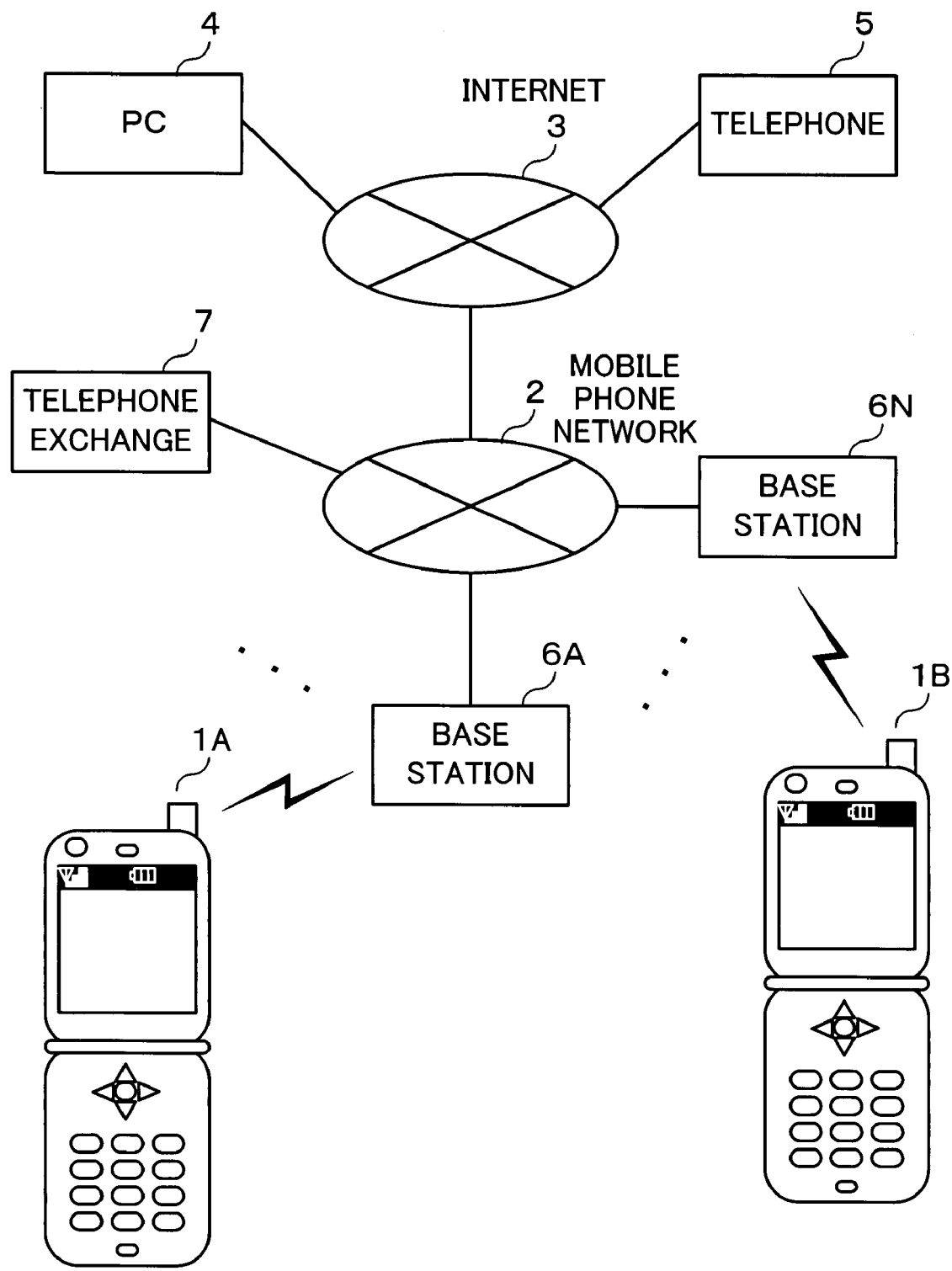
FIG. 1 is a block diagram showing a communication network system using mobile phone apparatuses.

FIG. 1 is a block diagram showing a communication network system using mobile phone apparatuses 1 (denoted as 1A and 1B in the drawing). In the diagram, the mobile phone apparatus 1A are now communicating with the mobile phone apparatus 1B.

While in communication, the mobile phone apparatus 1A is connected to the mobile hone apparatus 1B on the other side of the line, through a portable wireless network (public mobile communication network), which comprises base stations 6 (denoted as 6A and 6B in the drawing) and a telephone exchange 7. Further, the mobile phone apparatuses 1A and 1B are capable of communicating with a personal computer (PC) 4 having an IP (Internet Protocol) telephone function and with a telephone (land phone) 5. The mobile phone apparatuses 1A and 1B can serves as a voice telephone which performs communication by sending and receiving voice data, and as a videophone which performs communication by sending and receiving real time images in addition to voices. Further, the mobile phone apparatus 1 can perform e-mail sending/receiving, data communication connected to the Internet, etc.

In the following explanation, a telephone communication using voices and images will be called "videophone" communication, and a telephone communication using only voices will be called "voice phone" communication. Though the mobile phone apparatus 1 is used on both the calling side and the receiving side to make the invention understandable, the mobile phone apparatus 1 may be used only on the calling side.

Figure 2:
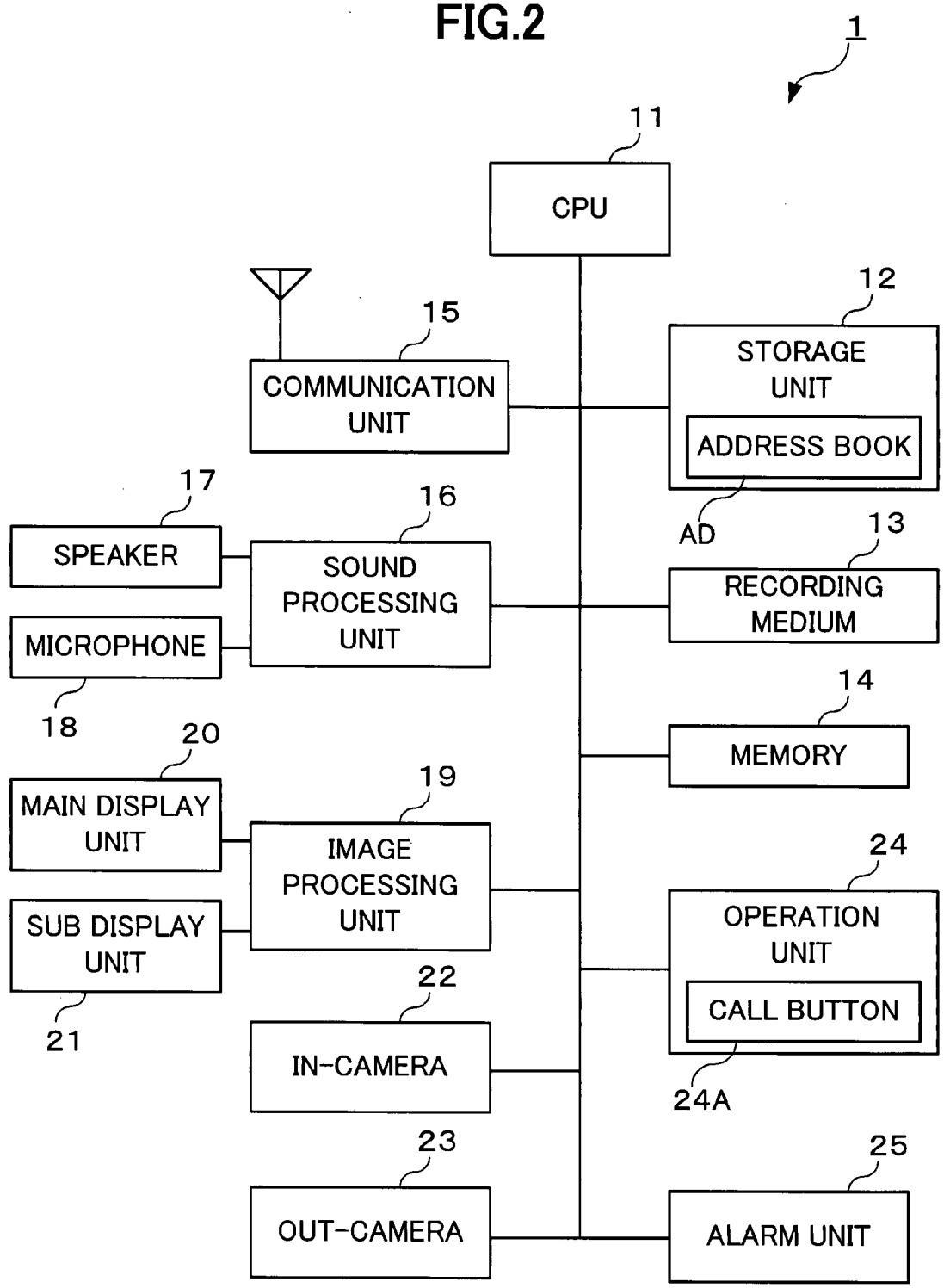
FIG. 2 is a block diagram showing basic structural elements of a mobile phone apparatus.

FIG. 2 is a block diagram showing basic structural elements of the mobile phone apparatus 1.

A CPU (Central Processing Unit) 11 controls the entire mobile phone apparatus 1 according to various programs in a storage unit 12. The storage unit 12 is an internal memory, and includes a program area and a data area. For example, a program for telephone communication, which is to be described later, is stored in the program area. An address book AD, which is to be described later, is stored in the data area. A recording medium 13 is a detachable and carriable memory for storing various data and programs. For example, the recording medium 13 is a flash memory card, an IC card, etc. used in general. A memory 14 is an internal-memory including a work area. Data in the memory 14 is saved in the storage unit 12 as necessity arises.

A communication unit 15 acquires a sound signal by a sending/receiving unit (unillustrated) connected to an antenna, demodulates the signal into an incoming base band signal, and inputs it to a sound processing unit 16. The sound processing unit 16 converts the input signal into an analog signal by a digital/analog converter, and outputs a sound from a sound speaker 17. Further, the sound processing unit 16 converts a sound collected by a microphone (mike) 18 into sound data by an analog/digital converter, and inputs the data to the communication unit 15. The communication unit 15 encodes the input sound data into an outgoing base band signal, and sends it from the antenna. Through this process, the user can perform telephone communication by the voice phone.

In case of the videophone, the communication unit 15 further receives image data (for example, image data representing the face of the person on the other side of the line) from the person on the other side of the line, and a image processing unit 19 displays the image on a main display unit 20. A sub display unit 21 displays the present date and time, a brief message, icons, etc. The main display unit 20 and the sub display unit 21 comprises, for example, an LCD (Liquid Crystal Display). Image data (for example, image data representing the face of the person on the this side of the line) shot by a in-camera 22 or an out-camera 23 is input to the image processing unit 19, and the image processing unit 19 converts the image data into image data of a predetermined format, and inputs it to the communication unit 15. The communication unit 15 sends the image data to the person on the other side of the line. Through this process, the user can perform telephone communication by the videophone.

The in-camera 22 shoots mainly the face of the user, who is the person on this side of the line. The out-camera 23 shoots mainly objects outside. For example, the mobile phone apparatus 1 comprises an operation purpose housing and a display purpose housing, which are attached to each other foldable. When these two housings are opened, the in-camera 22 is arranged on the internal side of the display purpose housing (the side of the main display unit 20) so as to have its lens system face the user (shooter). On the other hand, the out-camera 23 is arranged on the external side of display purpose housing (the side opposite to the in-camera 22) so as to have its lens system face away from the user. The in-camera 22 and the out-camera 23 comprise a lens-mirror block including a shooting lens, a mirror, etc., an image pickup device, a drive system therefor, a ranging sensor, a light amount sensor, an analog processing circuit, a signal processing circuit, a compression/decompression circuit, etc. The CPU 11 controls optical zoom, auto focus, shutter drive, exposure, white balance, etc., by these circuits.

An operation unit 24 receives dial input, text input, command input, etc. from the user, and inputs them to the CPU 11. For example, the operation unit 24 comprises a call button 24A for starting a telephone communication, etc. The CPU 11 performs a process corresponding to a key input signal from the operation unit 24. The call button 24A instructs a start of a telephone communication by the videophone or by the voice hone. An alarm unit 25 comprises a speaker for notifying reception of a call or an e-mail, an LED (Light Emitting Diode), and a vibration motor, and is driven under the control of the CPU 11 when a call or an e-mail is received to notify this reception, and also driven to give an alarm. The speaker for the notifying purpose may be served commonly by the above-described speaker 17.

Figure 3:
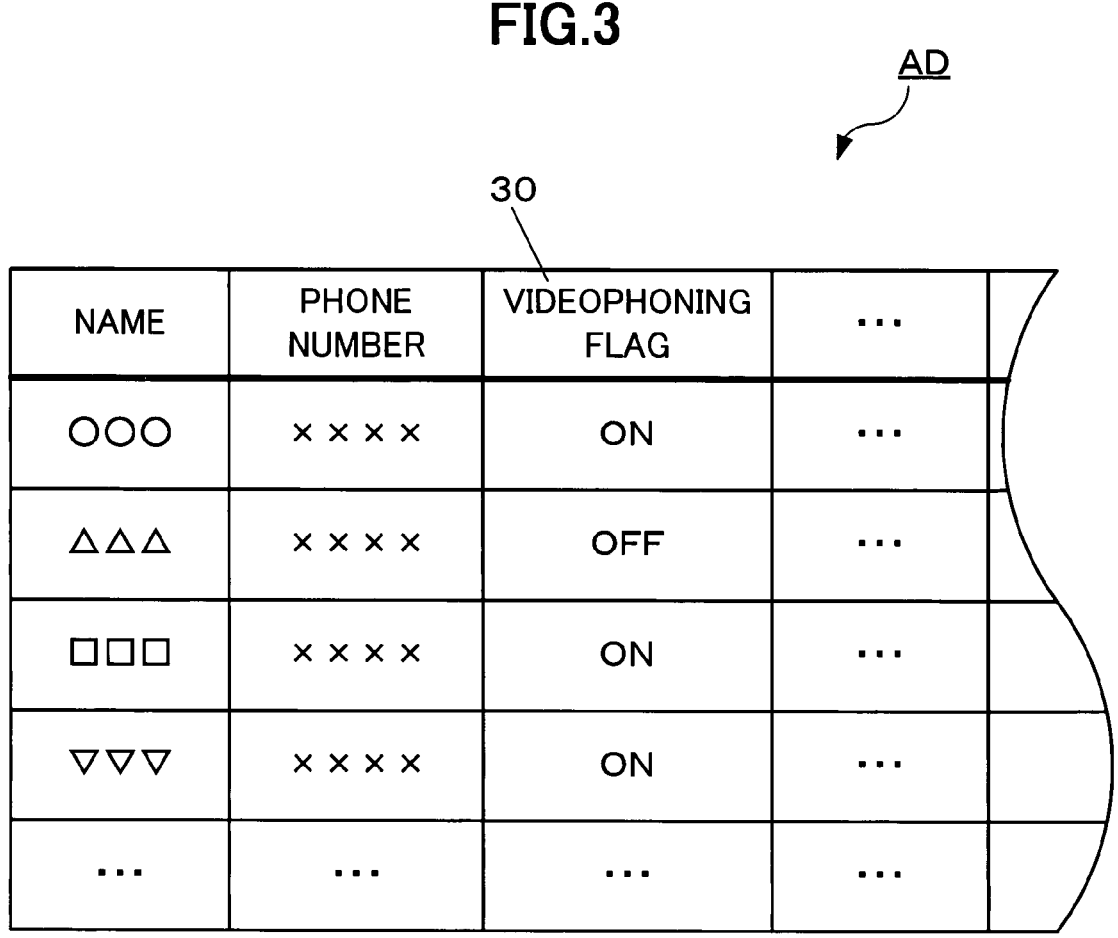
FIG. 3 is a diagram for explaining information stored in an address book.

FIG. 3 is a diagram for explaining the address book AD stored in the storage unit 12. The address book AD records data such as a phone number, etc. for each person to communicate with. To be more specific, each record associates name, phone number, videophoning flag 30, etc., and also, for example, address, face image, e-mail address, etc. with one another. Data such as name, phone number, address, face image, etc. are data input by the user from the operation unit 24, or set arbitrarily based on data stored in the recording medium 13. A videophoning flag 30 is set by the CPU 11 each time a phone call is made, according to whether it is a call by the videophone or a call by the voice phone.

The videophoning flag 30 is information indicating whether the last phone call made from this side is by the videophone or by the voice phone. For example, the CPU 11 sets "ON" if the last phone call is by the videophone, and "OFF" if it is by the voice phone. Note that as the default setting, the CPU 11 sets the videophoning flag 30 to "OFF" for each record. However, the user may manually set the videophoning flag 30 of a desired person.

The videophoning flag 30 is a phone call making record showing the last communication method. When making a phone call, the CPU 11 refers to the videophoning flag 30 of the person to whom the phone call is addressed, and makes the call by the videophone preferentially if the last phone call to that person is by the videophone or makes the call by the voice phone preferentially if the last phone call is by the voice phone. As known from this, the videophoning flag 30 is information indicating whether to prioritize the videophone or not. The CPU 11 can take over the communication method used last, in making the next phone call. The user does not have to refresh the choice of the communication method.

In other words, the videophoning flag 30 is the history of the communication method indicating whether the last phone call is by the videophone or by the voice phone. The CPU 11 refers to the history of communications with a person when making a phone call to that person, and again uses the videophone if the videophone is used last, or uses the voice phone this time again if the voice phone is used last. This exempts the user from having to make another choice of the communication method that is suitable for the person to communicate with, when making a phone call to that person.

On the other hand, when a phone call from a videophone is received, the CPU 11 refers to the videophoning flag 30 of the calling person, and permits communication by the videophone if the last phone call made to that person is by the videophone, but rejects communication by the videophone if the last phone call is by the voice phone. Hence, the user does not have to make another choice of the communication method suitable for the person to communicate with, when a phone call from that person is received.

Note that the CPU 11 may control the image processing unit 19 to display an asking message that asks whether to communicate by the videophone or not, to permit communication by the videophone or reject an incoming phone call from a videophone according to an instruction from the user.

In a case where the phone number of a person to communicate with is not pre-stored in the address book AD or in a case where the videophoning flag 30 of a person to communicate with is set to neither ON nor OFF, the CPU 11 controls the communication unit 15 to use a predetermined communication method, when making a phone call to that person. Therefore, the user is not required to do anything even when no videophoning flag 30 is set. According to the present embodiment, the CPU 11 controls a phone call to be made by the voice phone. As will be described later, the mobile phone apparatus 1 can switch to the videophone while communicating by the voice phone. Therefore, the user may first communicate by the voice phone, and then switch to the videophone if necessary.

Next, the process performed by each unit of the mobile phone apparatus 1 will be explained with reference to the flowcharts shown in FIG. 4 and FIG. 5. Each step described in the flowcharts is stored in the storage unit 12 in the form of a readable program code, and the CPU 11 controls each unit to operate according to the program code. Or, each unit may perform an operation according to the program code, which comes transmitted through a transmission medium. That is, the process can be performed with the use of a program and data which are prepared in a storage medium, or externally supplied through a transmission medium. Note that FIG. 4 and FIG. 5 are flowcharts showing the features of the present embodiment from the overall operation of the mobile phone apparatus 1.

(Communication Process when Making a Call)

Figure 4:
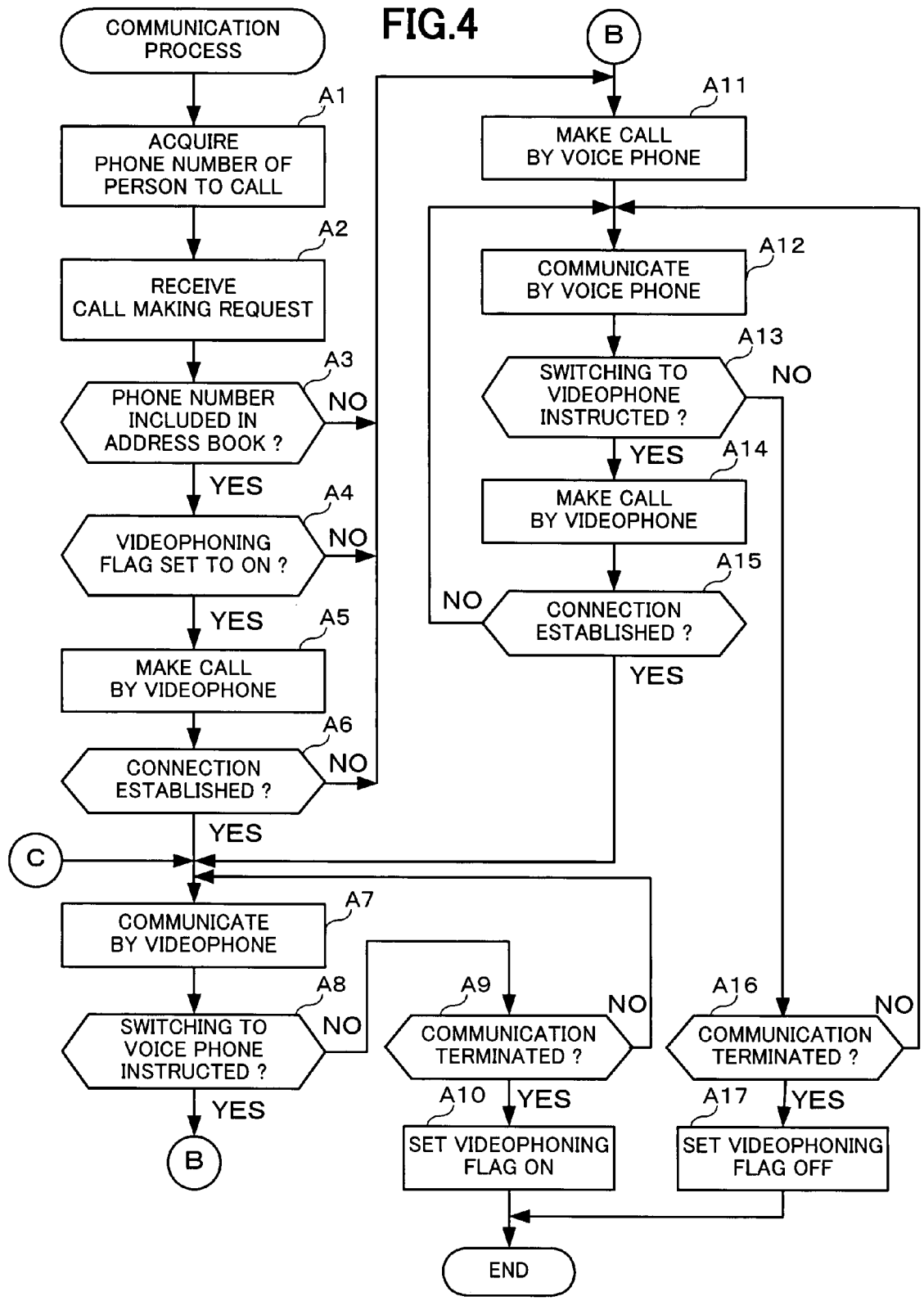
FIG. 4 is a flowchart showing a communication process started upon an operation on a call button.
Figure 5:
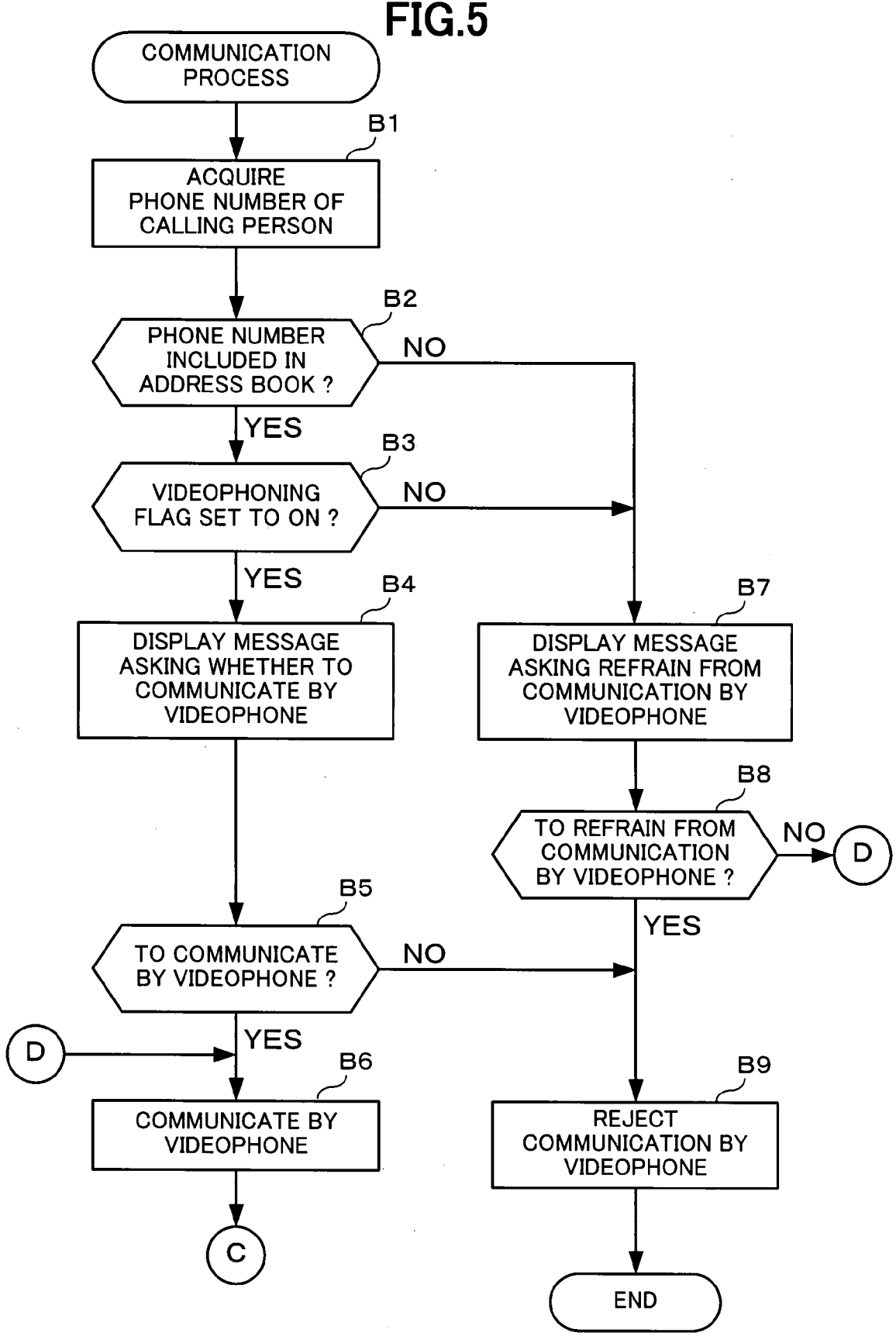
FIG. 5 is a flowchart showing a communication process started when a call is received from a person.

FIG. 4 is a flowchart showing a communication process, which is started when the user depresses the call button 24A.

First, by the user selecting any phone number from the address book AD or directly inputting a phone number from the operation unit 24, the CPU 11 acquires the phone umber of the person to communicate with (step A1). The CPU 11 receives an instruction to make a call (an off-hook operation) (step A2). When the user instructs making a call, the CPU 11 determines whether the same phone number as the input phone number is included in the address book AD, i.e., whether the phone number of the person communicate with is selected from the address book AD or directly input (step A3).

In a case where the phone number to communicate with is selected from the address book AD (step A3; YES), the CPU 11 refers to the videophoning flag 30 of this person, and determines whether the videophoning flag 30 is set to ON or OFF (step A4).

In a case where the videophoning flag 30 is set to ON (step A4; YES), the CPU 11 makes a call to this phone number by the videophone (step A5). On the other hand, in a case where the videophoning flag 30 is set to OFF (step A4; NO), the CPU 11 goes to step A11 described later.

Then, the CPU 11 checks whether connection to the person to communicate with is established or not (step A6). In a case where it is determined that connection to the person to communicate with is established (step A6; YES), the CPU 11 starts communication by the videophone (step A7). On the other hand, in a case where it is determined that connection to the person to communicate with is not established (step A6; NO), the CPU 11 goes to step A11.

Then, the CPU 11 determines whether or not switching from the videophone to the voice phone is instructed (step A8). In a case where it is determined that switching is not instructed (step A8; NO), the CPU 11 determines whether the line is disconnected to terminate the communication (step A9). On the other hand, in a case where it is determined that switching is instructed (step A8; YES), the CPU 11 goes to step A11.

In a case where it is determined that the communication is not yet terminated (step A9; NO), the CPU 11 continues the communication (returns to step A7). In a case where it is determined that the communication is terminated (step A9; YES), the CPU 11 sets a value (ON) indicating that this communication session has been by the videophone, to the videophoning flag 30 associated with the person to have communicated with (step A10), and finishes the communication process.

In a case where the phone number of the person to communicate with is not registered in the address book AD, i.e., in a case where the phone number of the person to communicate with is directly input from the operation unit 24 (step A3; NO), the CPU 11 makes a call to this phone number by the voice phone (step A11). The, when connection to the person to communicate with is established, the CPU 11 starts communication by the voice phone (step A12).

Then, the CPU 11 determines whether or not switching from the voice phone to the videophone is instructed (step A13). In a case where it is determined that switching is not instructed (step A13; NO), the CPU 11 determines whether the line is disconnected and the communication is terminated (step A16). On the other hand, in a case where it is determined that switching is instructed (step A13; YES), the CPU 11 goes to step A14 described later.

In a case where it is determined that the communication is not terminated (step A16; NO), the CPU 11 continues the communication process (returns to step A12). In a case where it is determined that the communication is terminated (step A16; YES), the CPU 11 sets a value (OFF) indicating that this communication has been by the voice phone to the videophoning flag 30 associated with the person to have communicated with (step A17), and finishes the communication process.

In a case where switching to the voice phone during videophoning is instructed (step A8; YES), the CPU 11 moves to step A11 described above to control the communication unit 15 to make a call from the voice phone (step A11), to start communication by the voice phone (step A12), and to terminate the communication by the voice phone.

Further, in a case where switching to the video phone is instructed during voice phoning (step A13; YES), the CPU 11 controls the communication unit 15 to make a call from the videophone (step A14), and checks whether connection to the person to communicate with is established or not (step A15). The CPU 11 controls the communication unit 15 to start communication by the videophone (step A7) in a case where connection to the person to communicate with is established (step A15; YES), or continues the communication by the voice phone (step A12) in a case where connection to the person to communicate with is not established (step A15; NO).

(Communication Process when Receiving a Call)

FIG. 5 is a flowchart showing the communication process which is started when a call from a person is received.

First, when a call is received, the CPU 11 acquires the phone number of the person (calling person) who makes the call (step B1). The CPU 11 searches the address book AD based on the phone number, and determines whether or not the same phone number is registered in the address book AD, i.e., whether or not the call is from someone registered in the address book AD (step B2). In a case where the call is from a person registered in the address book AD (step B2; YES), the CPU 11 refers to the videophoning flag 30 of that person to determine whether the flag 30 is set to ON or OFF (step B3). In a case where the videophoning flag 30 is set to ON, i.e., in a case where the last call made to that person is by the videophone (step B3; YES), the CPU 11 controls the image processing unit 19 to display an asking message that asks whether or not to permit communication by the videophone (step B4). On the other hand, in a case where the videophoning flag 30 is set to OFF (step B3; NO), the CPU 11 goes to step B7 described later.

In a case where to communicate by the videophone is instructed by an operation of the user (step B5; YES), the CPU 11 controls the communication unit 15 to start communication by the videophone (step B6), and goes to step A7 of FIG. 4 described above. That is, in this case, the communication unit 15 sends and receives video signals, in addition to sound signals for the telephone communication, under the control of the CPU 11. On the other hand, in a case where not to communicate by the videophone is instructed (step B5; NO), the CPU 11 rejects communication by the videophone (step B9). That is, in this case, the communication unit 15 sends and receives no video signals but only sound signals for the telephone communication under the control of the CPU 11. In a case where communication by the videophone is rejected, it is desirable that a predetermined message such as "this number cannot receive a video call", "the videophone on this number cannot be used", etc. should be sent to the calling person. Or, it is desirable that a predetermined substitute image should be sent to the calling person. This enables the calling person to know whether the person who receives his/her call can show up on the videophone.

In a case where the call is from a person unregistered in the address book AD (step B2; NO), or in a case where the calling person is registered in the address book AD but the videophoning flag 30 of that person is set to OFF, or in a case where the last call made to the calling person is by the voice phone (step B3; NO), the CPU 11 controls the image processing unit 19 to display an asking message which asks whether to refrain from communication by the videophone (step B7).

In a case where to refrain from communication by the videophone is instructed by an operation of the user (step B8; YES), the CPU 11 rejects communication by the videophone (step B9). That is, in this case, the communication unit 15 sends and receives not video signals but only sound signals for the telephone communication under the control of the CPU 11. In this case too, it is desirable that a predetermined message indicating that communication by the videophone is not available should be sent to the calling person, or that a predetermined substitute image should be sent to the calling person. On the other hand, in a case where to communicate by the videophone is instructed (step B8; NO), the CPU 11 starts communication by the videophone (step A7 of FIG. 4). In this case, the communication unit 15 sends and receives also video signals in addition to sound signals for the telephone communication under the control of the CPU 11.

As described above, according to the present embodiment, the name, the phone number, and the videophoning flag 30 indicating whether or not to use the videophone preferentially are stored in the address book AD for each person to communicate with. When controlling the communication unit 15 to make a call to an arbitrary person, the CPU 11 refers to the videophoning flag 30 of that person and determines whether to prioritize the voice phone or to prioritize the videophone. The CPU 11 makes a call from the videophone if preference to the videophone is indicated, and makes a call from the voice phone if preference to the voice phone is indicated. Hence, the user can have either the videophone or the voice phone selected appropriately when making a phone call, and can be prevented from making a meaningless call. Since communication by the voice phone is performed in a case where the person on the other side of the line is not registered in the address book AD, the user can make selection as he/she likes, in such a way as to prioritize the voice phone for anyone who is not familiar with the user because he/she does not want to show his/her view to such a person. Further, the user can select which of the videophone and the voice phone to prioritize, based on the past communication history.

Even if the videophoning flag 30 is set to OFF when the call button 24A is operated, the communication by the voice phone can be switched in response to a telephones switching instruction to make a call to that person from the videophone. Then, when the person receives the call, the communication is switched to the videophone and the videophoning flag 30 is changed to ON. As can be known from this, the videophoning flag 30 can be changed even while communication is performed by the voice phone.

Further, even if the videophoning flag 30 is set to ON when the user operates the call button 24A, the mobile phone apparatus 1 switches to the voice phone and changes the videophoning flag 30 to OFF when instructed to switch to the voice phone while performing communication by the videophone. As known from this, the videophoning flag 30 can be changed even while communication is performed by the videophone.

Switching from the videophone to the voice phone or from the voice phone to the videophone can be done as many times as needed, and the videophoning flag 30 is changed to correspond to the final communication method. Hence, the mobile phone apparatus 1 can select the communication method that is the most suitable for the user to communicate with a person.

When a call is received by the videophone, the CPU 11 refers to the videophoning flag 30, which shows the history of a call made to that person, and determines whether or not to permit communication by the videophone. Therefore, the CPU 11 can select appropriately whether to communicate by the videophone or to communicate by the voice phone. The user does not have to confirm whether or not to communicate by the videophone according to who is calling, each time a call is received by the videophone.

When the user rejects communication by the videophone, the CPU 11 performs communication by the voice phone upon notifying to the calling person that communication by videophone is not available. Therefore, the user's intent can be reflected.

(Embodiment 2)

Next, another embodiment of the present invention will be explained. In the above-described embodiment, the communication history shows the record of whether a call is made to a person by the videophone or by the voice phone. However, the communication history may include not only a call making record but also a call receiving record. Further, the communication history may be information indicating the frequency of use of the videophone (or the voice phone) in the past, and the videophoning flag 30 may be set according to the frequency of use. The following explanation will be given with reference to FIG. 6 and FIG. 7.

Figure 6:
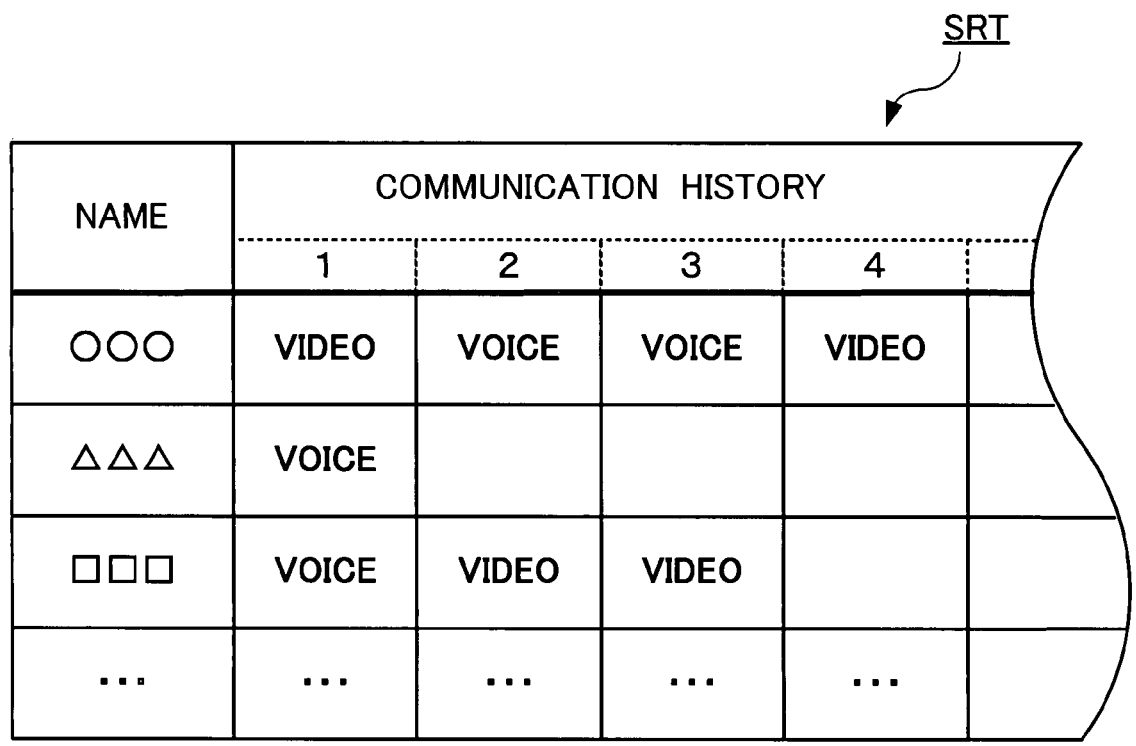
FIG. 6 is a diagram for explaining an example of the structure of a communication history table according to a second embodiment.

FIG. 6 is a diagram for explaining a communication history table SRT.

The communication history table SRT is stored in the storage unit 12, and stores call making records and call receiving records indicating whether the call concerned is by the videophone or by the voice phone, for each person registered in the address book AD, for a predetermined number of past calls. For example, in the diagram, "VIDEO" is stored when the communication is by the videophone or "VOICE" is indicated when the communication is by the voice phone, for each person with whom the communication has been performed. When a call is made from the communication unit 15, the CPU 11 stores data indicating whether it is the call by the videophone or by the voice phone in the communication history table SRT as a record of communication with the person concerned. Another type of data indicating whether the call is by the video phone or by the voice phone may be stored in association with the person. In a case where the number of times communications are performed exceeds a predetermined number of times, the CPU 11 deletes the oldest communication record and stores the communication records of the latest predetermined number of communication sessions.

Figure 7:
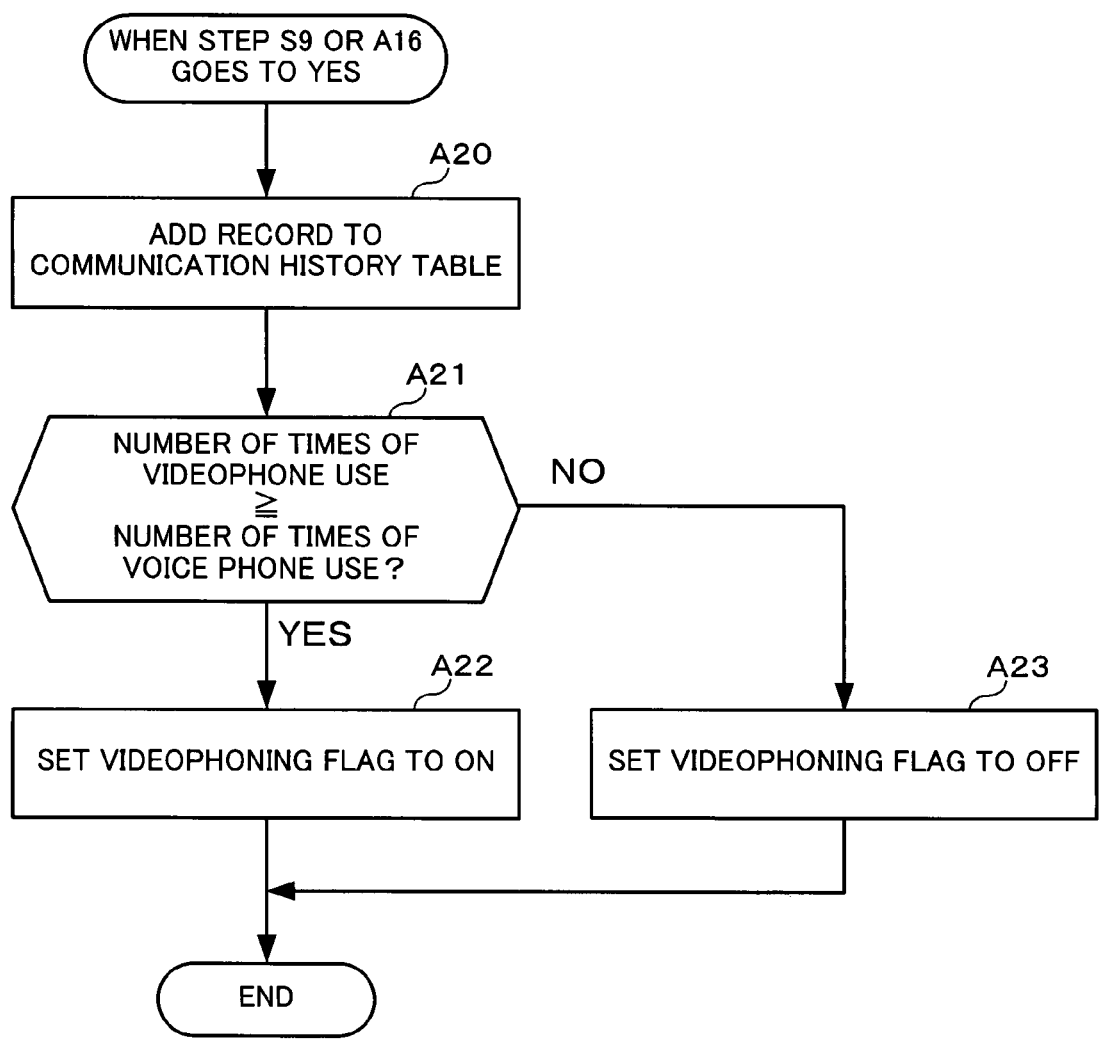
FIG. 7 is a flowchart for explaining a process for setting a videophoning flag according to communication history (frequency of use) according to the second embodiment.

FIG. 7 is a flowchart for explaining an operation for setting the videophoning flag 30 according to the frequency of use of the videophone or the voice phone. This operation is performed when step A9 or step A16 of FIG. 4 goes to YES, instead of the succeeding step A10 or step A17.

First, when communication termination is detected during videophoning (step A9 of FIG. 4; YES) or when communication termination is detected during voice phoning (step A16 of FIG. 4; YES), the CPU 11 registers a communication record indicating that the communication this time is by the videophone or by the voice phone in the communication history table SRT in association with the person to have communicated with (step A20).

Then, the CPU 11 refers to the communication history table SRT to search for the communication history regarding the person to have communicated with, and calculates the number of times the videophone is used and the number of times the voice phone is used, respectively (step A21).

In a case where the number of times the videophone is used is equal to or larger than the number of times the voice phone is used (step A21; YES), the CPU 11 sets the videophoning flag 30 in the address book AD associated with the person concerned to ON (step A22). On the other hand, in a case where the number of times the videophone is used is smaller than the number of times the voice phone is used (step A21; NO), the CPU 11 sets the videophoning flag 30 in the address book AD associated with that person to OFF (step A23).

In the present embodiment, in a case where the communication method is switched from the videophone to the voice phone or from the voice phone to the videophone, the videophoning flag 30 is changed to correspond to the final communication method. However, the videophoning flag 30 may be updated to ON, if the communication method is switched to the videophone at least once during a communication currently performed.

As obvious from the above, according to the present embodiment, the mobile phone apparatus 1 can select a communication method suitable for the user, according to the inclination in the past call making records and call receiving records.

(Embodiment 3)

Next, yet another embodiment of the present invention will be explained. When a call is received, the CPU 11 may permit communication with the calling person by the videophone if the last communication with this person is by the videophone, or may reject communication with the calling person by the videophone if the last communication with the person is by the voice phone. The details will be described below.

Figure 8:
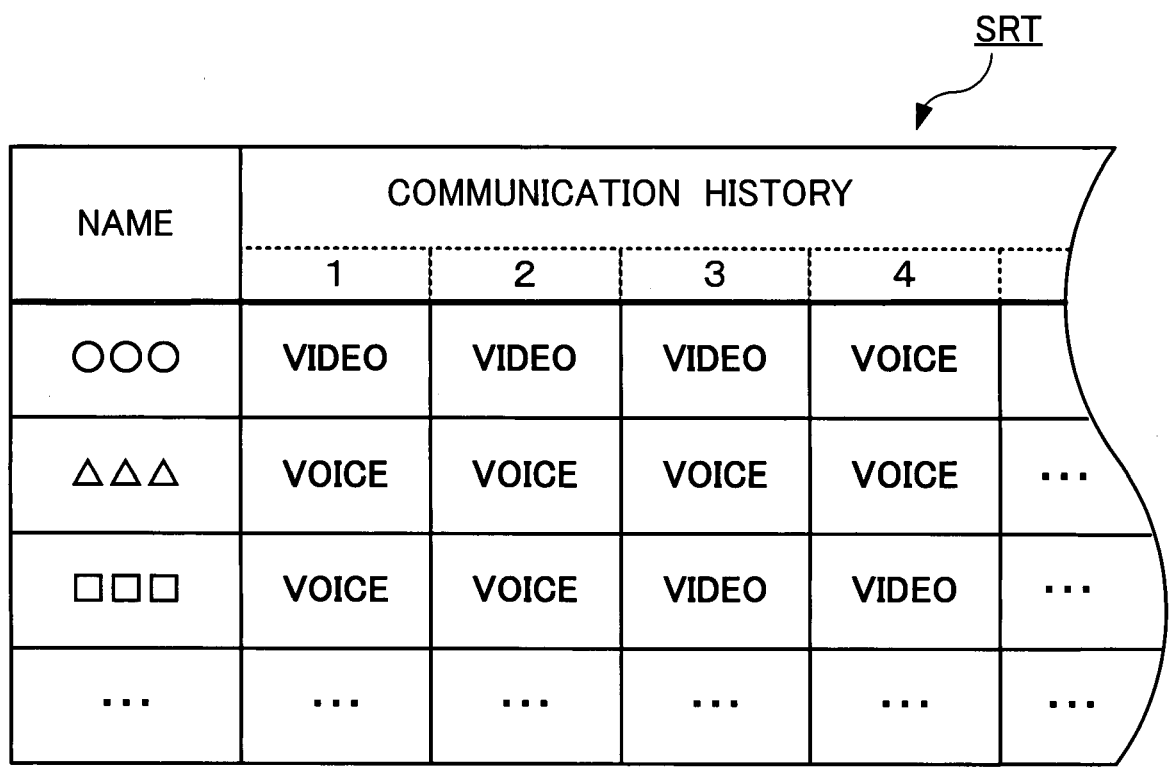
FIG. 8 is a diagram for explaining an example of the structure of a communication history table according to a third embodiment.

FIG. 8 shows an example of the structure of a communication history table SRT of the present embodiment. The communication history table SRT of the present embodiment is likewise stored in the storage unit 12, and stores communication records indicating whether the call concerned is made or received by the videophone or by the voice phone, for each person registered in the address book AD, for a predetermined number of past calls. When a call is made or received by the communication unit 15, the CPU 11 stores data indicating whether the call is by the videophone or by the voice phone in the communication history table SRT, as a communication record with the person concerned.

When a call is made to or received from a person, the CPU 11 refers to the communication history table SRT to search for the communication history regarding the person to communicate with this time on the call, and calculates the number of times the videophone is used up until the last call and the number of times the voice phone is used up until the last call. In a case where the number of times the videophone is used is equal to or larger than the number of times the voice phone is used, the CPU 11 sets the videophoning flag 30 in the address book AD associated with the person to communicate with to ON. On the other hand, in a case where the number of times the videophone is used is smaller than the number of times the voice phone is used, the CPU 11 sets the videophoning flag 30 in the address book AD associated with the person to communicate with to OFF.

Here, in a case where the current call is received by the videophone, the CPU 11 permits or rejects communication by the videophone according to whether the videophoning flag

30 is set to ON or OFF. In a case where the flag value is ON, the CPU 11 sends video data shot at the side of the mobile phone apparatus 1 (receiving side) to the other side of the line, and receives video data shot at the other side of the line (calling side) and controls the image processing unit 19 to display the received video data. Thereby, the user can talk on the videophone. The CPU 11 adds a record of the current communication by the videophone to the communication history table SRT.

On the other hand, in a case where the flag value is OFF, the CPU 11 does not send video data from the side of the mobile phone apparatus 1, or receive video data from the other side of the line. Here, the CPU 11 may let the user communicate by sending and receiving no video data but only sound data, or may send substitute video data which does not show the user's figure. Alternatively, the CPU 11 may reject having communication at all. The CPU 11 adds a record indicating that communication by the videophone is not permitted this time, to the communication history table SRT.

Note that in a case where the current call is received by the voice phone, the CPU 11 may let the communication be performed by the voice phone irrespective of the flag value of the videophoning flag 30. The CPU 11 may add a record of the current communication performed by the voice phone to the communication history table SRT.

As obvious from the above, according to the present embodiment, when a call is received, the mobile phone apparatus 1 can select a communication method suitable for the user, according to the inclination in the past call making records and call receiving records, and can select a method more appropriately in such a manner as to reflect the user's tendency.

(Embodiment 4)

Next, yet another embodiment of the present invention will be explained. The CPU 11 may select either the videophone or the voice phone in consideration of the communication time instead of the number of times calls are made or received.

Figure 9:
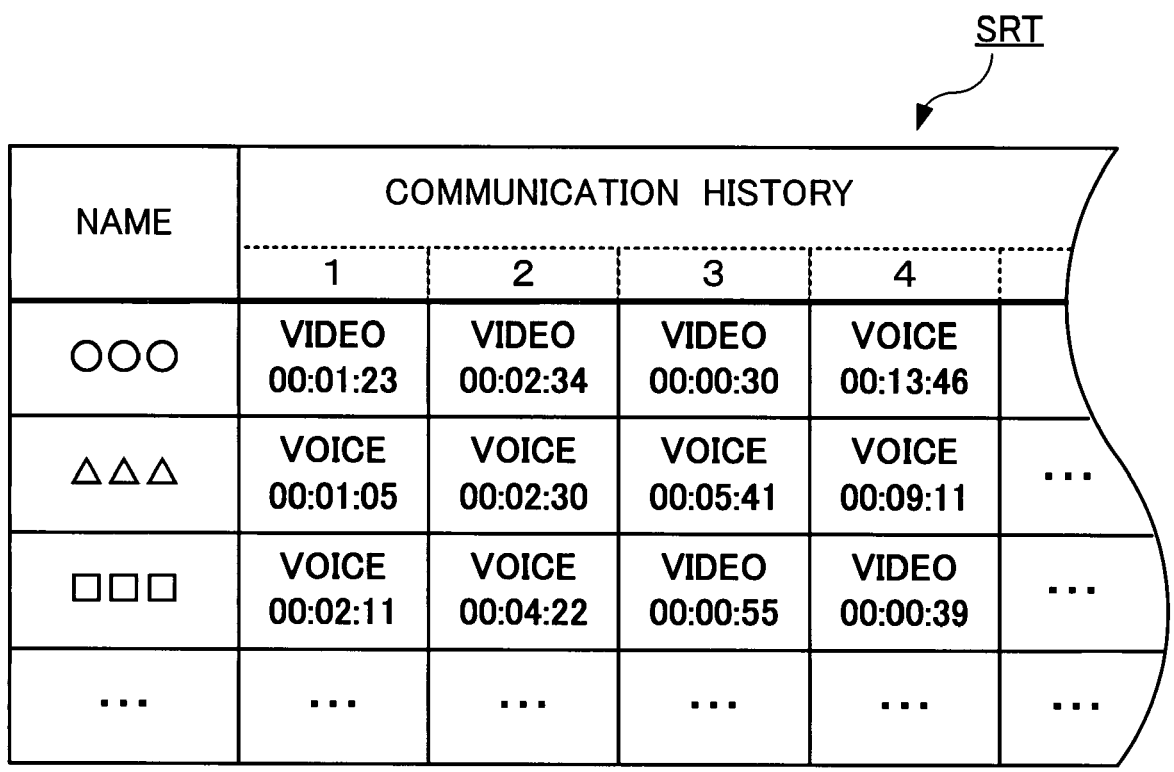
FIG. 9 is a diagram for explaining an example of the structure of a communication history table according to a fourth embodiment.

FIG. 9 shows an example of the structure of the communication history table SRT of the present embodiment. The communication history table SRT stores data indicating whether a call concerned is by the videophone or by the voice phone, and data indicating the communication time taken for the call, for each person registered in the address book AD, for a predetermined number of past calls. When a call made or received by the communication unit 15 is finished, the CPU 11 stores data indicating whether the call is by the videophone or by the voice phone and data indicating the communication time of the call in the communication history table SRT in association with the person to have communicated with on the call.

When a call is made to or received from a person, the CPU 11 refers to the communication history table SRT to search for the communication history regarding the person to communicate with on this call, and calculates the total communication time on the videophone and the total communication time on the voice phone, respectively.

In a case where the total communication time on the videophone is equal to or longer than the total communication time on the voice phone, the CPU 11 sets the videophoning flag 30 in the address book AD associated with that person to ON. On the other hand, in a case where the total communication time on the videophone is shorter than the total communication time on the voice phone, the CPU 11 sets the videophoning flag 30 in the address book AD associated with that person to OFF.

For example, even in a case where the number of times of communication by the videophone is larger than the number of times of communication by the voice phone, if the total communication time on the videophone is shorter than the total communication time on the voice phone, the CPU 11 selects the voice phone, not the videophone.

As obvious from the above, according to the present embodiment, the mobile phone apparatus 1 can appropriately select either the videophone or the voice phone according to the communication time taken by the user, and can select a communication method that better fits the reality.

(Embodiment 5)

Next, yet another embodiment of the present invention will be explained. The CPU 11 may select a communication method in consideration of the number of times of communication by the videophone and by the voice phone respectively, and the total communication time on the videophone and on the voice phone respectively. The details will be explained below.

When a call made or received by the communication unit 15 is finished, the CPU 11 stores data indicating whether the call is by the videophone or by the voice phone and data indicating the communication time taken for the call in the communication history table SRT, in association with the person to have communicated with on the call.

Figure 10:
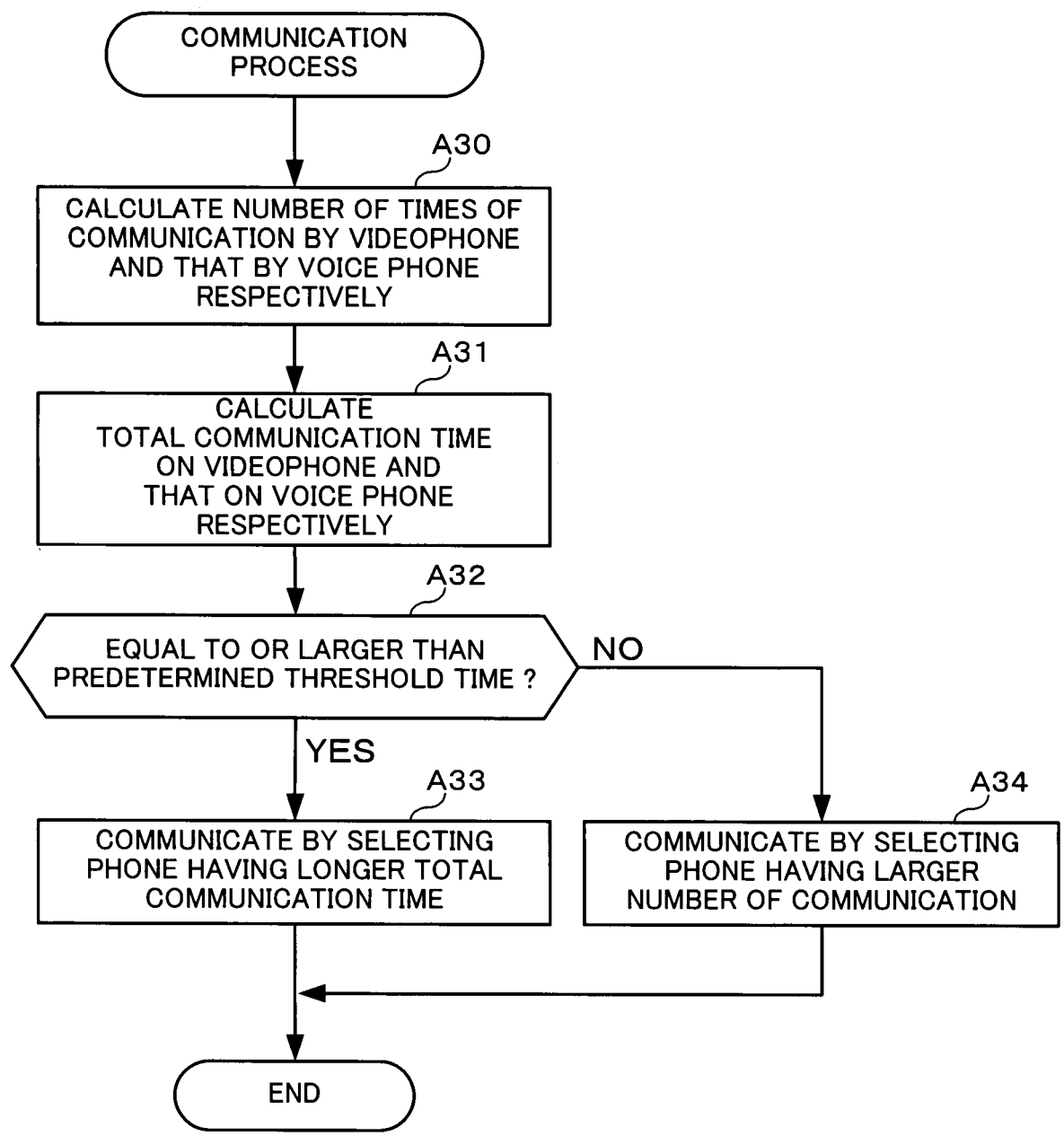
FIG. 10 is a flowchart for explaining a communication process according to a fifth embodiment.

FIG. 10 is a flowchart for explaining the communication process of the present embodiment. According to the present embodiment, the communication process is performed when a call from a person is received by the videophone.

When a call is made to or received from a person, the CPU 11 refers to the communication history table SRT to search for the communication history regarding the person to communicate with on the call, and calculates the number of times of communication by the videophone and the number of times of communication by the voice phone, respectively (step A30).

Further, the CPU 11 calculates the total communication time taken for communication with the person concerned on the videophone and the total communication time taken for communication with the person concerned on the voice phone, respectively (step A31).

In a case where either one of the total communication time on the videophone and the total communication time on the voice phone is equal to or longer than a redetermined threshold time (step A32; YES), the CPU 11 performs communication by selecting either of the videophone and the voice phone that has the longer total communication time (step A33).

On the other hand, in a case where the condition that either one of the total communication time on the videophone and the total communication time on the voice phone is equal to or longer than the predetermined threshold time is not satisfied, i.e., in a case where neither of the total communication times is equal to or longer than the predetermined threshold time (step A32; NO), the CPU 11 performs communication by selecting either of the videophone and the voice phone that has a larger number of times of communication (step A34).

For example, in a case where the user has communicated with a person only for a short time in total or a few times by using the mobile phone apparatus 1, the user may not be able to make up his/her mind if he/she should communicate with the person by the videophone. Hence, by providing a predetermined threshold time, the CPU 11 can select a communication method more appropriately. The length of the predetermined threshold time is arbitrary, and may be freely changed by the user. If the predetermined threshold time is set to zero second, the CPU 11 always selects the communication time whose total communication time is longer.

Before starting communication, the CPU 11 may control the image processing unit 19 to display an asking message which asks whether to permit communication by the videophone or not, and permit or reject communication by the videophone according to an instruction input by the user.

(Embodiment 6)

Next, still another embodiment of the present invention will be explained. In the above-described embodiments, the videophoning flag 30 is stored for each person. However, the address book data AD may be classified into groups according to whether the telephone of the person to communicate with is videophone-compatible or not. The details will be described below.

Figure 11:
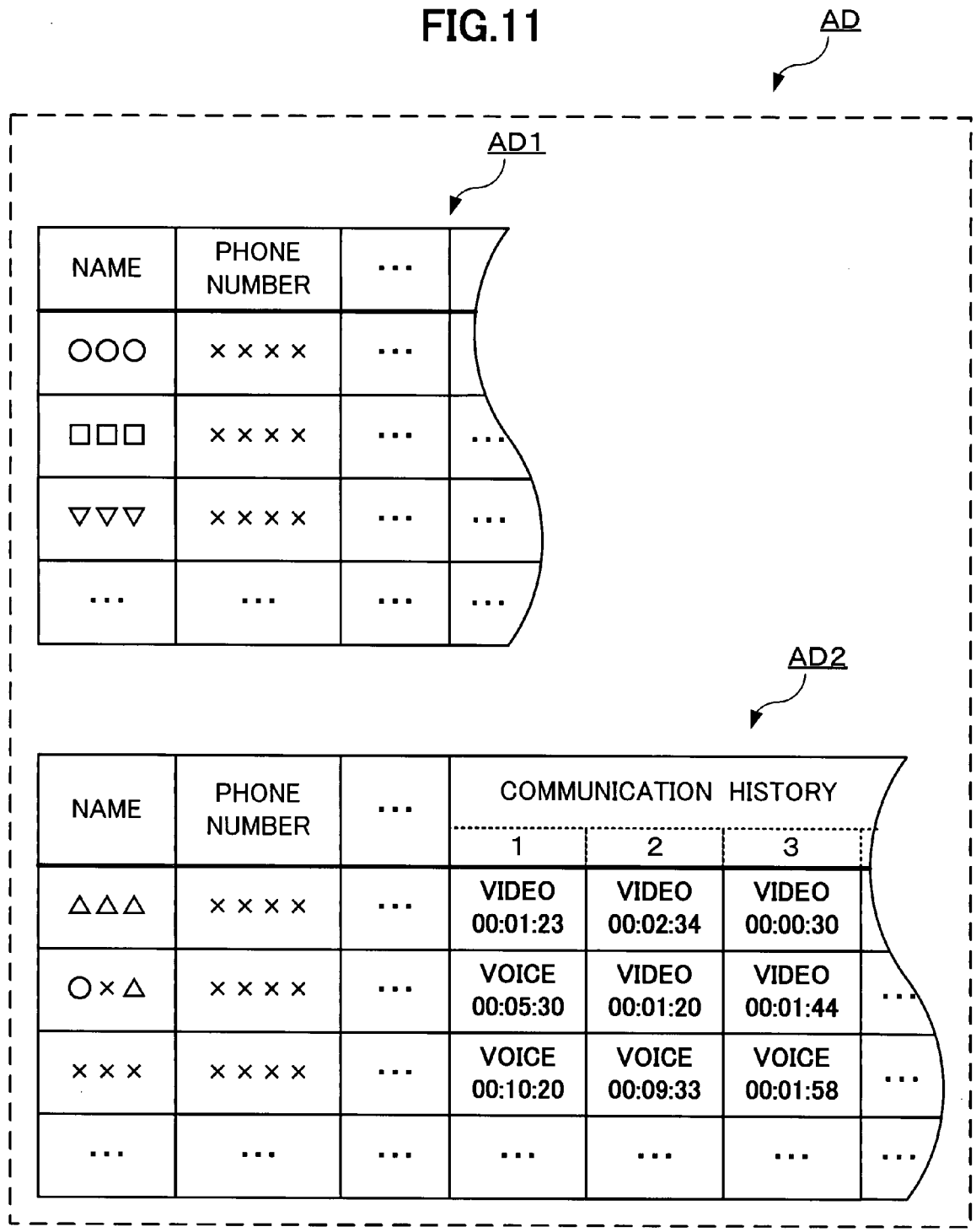
FIG. 11 is a diagram for explaining information stored in an address book according to a sixth embodiment.

FIG. 11 shows an example of the structure of the address book AD of the present embodiment. The address book AD includes an address book AD1 for persons with whom communication cannot be performed by the videophone and an address book AD2 for persons with whom communication can be performed by the videophone, and is stored in the storage unit 12. For example, the CPU 11 decides which of the address books AD1 and AD2 to use, depending on whether the person to communicate with has a videophone or not. The CPU 11 can update the information stored in the address books AD1 and AD2 at an arbitrary timing.

The address book AD1 stores the name and the phone number of a person to communicate with in association with each other. Additionally, the address book AD1 may store e-mail address, address, image data, etc.

The address book AD2 stores the name and the phone number of a person to communicate with, and communication records of calls made or received in association with one another. Additionally, the address book AD2 may store e-mail address, address, image data, etc. The communication records are the same as the information stored in the communication history table SRT described above. That is, according to the present embodiment, the address book AD and the communication history table SRT need not be separately stored but can be stored in one.

The operation unit 24 receives an instruction input from the user that indicates who or which phone number can communicate by videophone. The CPU 11 stores information in the address book AD2 if the person concerned can communicate by videophone or in the address book AD1 if not, based on the instruction input that has been input.

Further, the operation unit 24 receives an instruction input that instructs to display the information stored in the address book AD. The CPU 11 displays the information stored both in the address books AD1 and AD2 together, based on the instruction input that has been input. Though the storage unit 12 uses either the address book AD1 or the address book AD2 according to each information to be stored, it is not necessary for the user to be notified in which address book information of a person concerned is stored, when provided with information.

As obvious from the above, according to the present embodiment, the storage unit 12 does not have to store communication records regarding all the persons to communicate with, but needs only to store communication records regarding persons who can communicate by videophone, thus achieving an effect that the data amount can be reduced. In the present embodiment too, the storage unit 12 may store the videophoning flag 30 in association with the phone number of a person included in the address book AD2.

The present invention can be applied not only to a mobile phone apparatus with a videophone, but also to portable terminal apparatuses such as a PDA, an electronic camera, an electronic wristwatch, a music player, etc. with a videophone.

Further, the present invention can be applied not only to portable terminal apparatuses but also to a land phone with a videophone, and further to a PC (Personal Computer) with a videophone.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-197585 filed on Jul. 20, 2006 and including specification, claims, drawings and summary. The disclosure of the above Japanese Patent Application is incorporated herein by reference in its entirety.

What is claimed is:

1. A communication terminal apparatus, comprising:
a storage unit which stores a communication record indicating whether a communication has been performed by a videophone using both voices and images or by a voice phone using only voices, in association with a person to communicate with;
a determination unit which, when a call is to be made to an arbitrary person, determines whether to use the voice phone or to use the videophone by referring to the communication record stored in association with that person;
a communication control unit which makes a call to that person by either of the voice phone and the videophone that is determined by the determination unit; and
a calculation unit which calculates a frequency of use and stores said calculated frequency of use in the storage unit;
wherein in a case where a call from a person is received by the videophone, the determination unit determines whether to communicate with that person by the videophone, by referring to the communication record associated with that person, and in a case where the determination unit determines to communicate by the videophone, the communication control unit communicates with that person by the videophone; and
wherein, when a communication with a person is to be performed, the determination unit refers to the communication record stored in the storage unit in association with that person, and determines to communicate by a communication method that has a higher frequency of use.

2. The communication terminal apparatus according to claim 1, wherein the frequency of use further includes information indicating a number of times each communication method is used, and when a communication with a person is to be performed, the determination unit determines to communicate by a communication method that has been used a larger number of times in communications with that person.

3. The communication terminal apparatus according to claim 1, wherein the frequency of use further includes information indicating a total communication time taken for communications by each communication method, and when a communication with a person is to be performed, the determination unit determines to communicate by a communication method that has been used for a longer total communication time in communications with that person.

4. The communication terminal apparatus according to claim 1, wherein the frequency of use further includes information indicating a number of times each communication method is used, and information indicating a total communication time taken for communications by each communication method, and in a case where any of the total communication times of the respective communication methods is equal to or longer than a predetermined threshold time, the determination unit determines to communicate by a communication method that has been used for a longer total communication time in communications with a person, and otherwise, determines to communicate by a communication method that has been used a larger number of times in communications with that person.

5. A communication terminal apparatus, comprising:
a storage unit which stores a communication record indicating whether a communication has been performed by a videophone using both voices and images or by a voice phone using only voices, in association with a person to communicate with; and
a determination unit which, when a call is to be made to an arbitrary person, determines whether to use the voice phone or to use the videophone by referring to the communication record stored in association with that person;
a communication control unit which makes a call to that person by either of the voice phone and the videophone that is determined by the determination unit;
wherein in a case where a call from a person is received by the videophone, the determination unit determines whether to communicate with that person by the videophone, by referring to the communication record associated with that person, and in a case where the determination unit determines to communicate by the videophone, the communication control unit communicates with that person by the videophone; and
wherein the communication control unit asks a user whether to permit communication by the videophone, and communicates by the videophone in a case where the user permits communication by the videophone in response to the asking, and notifies that person of rejection of communication by the videophone.

6. A communication method, comprising:
a determining step of, when a call is to be made to an arbitrary person, determining whether to use a voice phone using only voices or to use a videophone using both voices and images, by referring to a communication record stored in memory indicating whether a call has been made to that person by the voice phone or by the videophone, the communication record stored in memory including information indicating frequency of use of each communication method in a past;
a communication controlling step of making a call to that person by either of communication methods by the voice phone and by the videophone, which is determined at the determining step; and
a calculating step of calculating the frequency of use, and storing the calculated frequency of use in the storage unit;
wherein, when a communication with a person is to be performed, the determination step includes referring to the communication record stored in the storage unit in association with that person, and determining to communicate by a communication method that has a higher frequency of use.

7. A non-transitory computer-readable information recording medium storing a program for controlling a computer to function as:
a storage unit which stores a communication record indicating whether a call has been made by a voice phone using only voices or by a videophone using both voices and images, in association with a person to communicate with, the communication unit including information indicating frequency of use of each communication method;
a determination unit which, when a call is to be made to an arbitrary person, determines whether to use the voice phone or to use the videophone by referring to the communication record associated with that person; and a communication control unit which makes a call to that person by either of the voice phone and the videophone that is determined by the determination unit; and
a calculation unit which calculates the frequency of use and stores said calculated frequency of use in the storage unit;
wherein, when a communication with a person is to be performed, the determination unit refers to the communication record stored in the storage unit in association with that person, and determines to communicate by a communication method that has a higher frequency of use.

8. A communication method comprising:
a determining step of, when a call is to be made to an arbitrary person, determining whether to use a voice phone using only voices or to use a videophone using both voices and images, by referring to a communication record stored in a memory in association with that person indicating whether a call has been made to that person by the voice phone or by the videophone; and
a communication controlling step of making a call to that person by either of communication methods by the voice phone and by the videophone, which is determined at the determining step;
wherein, when a call from a person is received on the videophone, the determination step includes referring to the communication record associated with that person, and determining whether to communicate by the videophone; and
wherein the communication control step includes asking a user whether to permit communication by the videophone, and communicating by the videophone in a case where the user permits communication by the videophone in response to the asking, and notifying that person of rejection of communication by the videophone.

9. A non-transitory computer-readable information recording medium for controlling a computer to function as:
a storage unit which stores a communication record indicating whether a communication has been performed by a videophone using both voices and images or by a voice phone using only voices, in association with a person to communicate with;
a determination unit which, when a call is to be made to an arbitrary person, determines whether to use the voice phone or to use the videophone by referring to the communication record stored in association with that person; and
a communication control unit which makes a call to that person by either of the voice phone and the videophone that is determined by the determination unit;
wherein, when a call from a person is received on the videophone, the determination unit refers to the communication record associated with that person, and determines whether to communicate by the videophone; and
wherein the communication control unit asks a user whether to permit communication by the videophone, and communicates by the videophone in a case where the user permits communication by the videophone in response to the asking, and notifies that person of rejection of communication by the videophone.

* * * * *